United States Patent
Baker

(10) Patent No.: US 6,791,586 B2
(45) Date of Patent: *Sep. 14, 2004

(54) DYNAMICALLY AUTOCONFIGURED FEATURE BROWSER FOR A COMMUNICATION TERMINAL

(75) Inventor: Albert D. Baker, Lincroft, NJ (US)

(73) Assignee: Avaya Technology Corp., Basking Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/421,821

(22) Filed: Oct. 20, 1999

(65) Prior Publication Data

US 2003/0080993 A1 May 1, 2003

(51) Int. Cl.[7] .................................................. G09G 5/00
(52) U.S. Cl. ....................... 345/811; 455/566; 345/812; 345/854
(58) Field of Search ................................. 345/811, 812, 345/854, 160, 168, 738, 739, 733, 744, 745, 747, 825; 379/387, 93.17; 455/566

(56) References Cited

U.S. PATENT DOCUMENTS

| 5,396,264 | A | * | 3/1995 | Falcone et al. ............. 345/160 |
| 5,774,540 | A | * | 6/1998 | Davidson et al. ............ 379/387 |
| 5,838,906 | A | * | 11/1998 | Doyle et al. ............ 345/200.32 |
| 6,032,184 | A | * | 2/2000 | Cogger et al. ............... 709/223 |
| 6,125,287 | A | * | 9/2000 | Cushman et al. ........ 379/93.17 |
| 6,212,536 | B1 | * | 4/2001 | Klassen et al. .............. 707/513 |
| 6,232,982 | B1 | * | 5/2001 | Harding ...................... 345/433 |
| 6,317,781 | B1 | * | 11/2001 | De Boor et al. ............ 345/700 |

OTHER PUBLICATIONS

DEFINITY® Enterprise Communications Server, Release 6, Administration and Feature Description, "Bridged Call Appearance," pp. 4–109 to 4–124, Aug. 1997.

DEFINITY® Enterprise Communications Server, Release 6, Administration and Feature Description, "Terminal Translation Initialization," pp. 4–562 to 4–569, Aug. 1997.

* cited by examiner

Primary Examiner—Kristine Kincaid
Assistant Examiner—Mylinh T Tran
(74) Attorney, Agent, or Firm—Ryan, Mason & Lewis, LLP

(57) ABSTRACT

A feature presentation order for a feature browser display of a communication system terminal is controlled in accordance with user-specific feature utilization history information. The utilization history information may include a set of utilization counters for each of a number of features supported by the system, and the presentation order may be determined by sorting the utilization values of the corresponding features in an increasing or decreasing order. Advantageously, the invention allows different user-specific utilization-based feature presentation orders to be provided to different users of the system.

23 Claims, 5 Drawing Sheets

| STATE=ON HOOK | | |
|---|---|---|
| PRESENTATION ORDER | UTILIZATION COUNTER | FEATURE NAME |
| 1 | 0 | AUTODIAL NUMBER 1 |
| 2 | 0 | HOLD |
| 3 | 0 | TRANSFER |
| 4 | 0 | CONFERENCE |
| 5 | 0 | SEND ALL CALLS |
| 6 | 0 | AUTODIAL NUMBER 2 |

210

| STATE=OFF HOOK | | |
|---|---|---|
| PRESENTATION ORDER | UTILIZATION COUNTER | FEATURE NAME |
| 1 | 0 | AUTODIAL NUMBER 1 |
| 2 | 0 | HOLD |
| 3 | 0 | TRANSFER |
| 4 | 0 | CONFERENCE |
| 5 | 0 | SEND ALL CALLS |
| 6 | 0 | AUTODIAL NUMBER 2 |

220

| STATE=ACTIVE | | |
|---|---|---|
| PRESENTATION ORDER | UTILIZATION COUNTER | FEATURE NAME |
| 1 | 0 | AUTODIAL NUMBER 1 |
| 2 | 0 | HOLD |
| 3 | 0 | TRANSFER |
| 4 | 0 | CONFERENCE |
| 5 | 0 | SEND ALL CALLS |
| 6 | 0 | AUTODIAL NUMBER 2 |

210 — STATE=ON HOOK

| PRESENTATION ORDER | UTILIZATION COUNTER | FEATURE NAME |
|---|---|---|
| 1 | 0 | AUTODIAL NUMBER 1 |
| 2 | 0 | HOLD |
| 3 | 0 | TRANSFER |
| 4 | 0 | CONFERENCE |
| 5 | 0 | SEND ALL CALLS |
| 6 | 0 | AUTODIAL NUMBER 2 |

220 — STATE=OFF HOOK

| PRESENTATION ORDER | UTILIZATION COUNTER | FEATURE NAME |
|---|---|---|
| 1 | 0 | AUTODIAL NUMBER 1 |
| 2 | 0 | HOLD |
| 3 | 0 | TRANSFER |
| 4 | 0 | CONFERENCE |
| 5 | 0 | SEND ALL CALLS |
| 6 | 0 | AUTODIAL NUMBER 2 |

230 — STATE=ACTIVE

| PRESENTATION ORDER | UTILIZATION COUNTER | FEATURE NAME |
|---|---|---|
| 1 | 0 | AUTODIAL NUMBER 1 |
| 2 | 0 | HOLD |
| 3 | 0 | TRANSFER |
| 4 | 0 | CONFERENCE |
| 5 | 0 | SEND ALL CALLS |
| 6 | 0 | AUTODIAL NUMBER 2 |

FIG. 5A

STATE=ON HOOK

| PRESENTATION ORDER | UTILIZATION COUNTER | FEATURE NAME |
|---|---|---|
| 3 | 12 | AUTODIAL NUMBER 1 |
| 4 | 0 | HOLD |
| 5 | 0 | TRANSFER |
| 6 | 0 | CONFERENCE |
| 1 | 32 | SEND ALL CALLS |
| 2 | 21 | AUTODIAL NUMBER 2 |

STATE=OFF HOOK

| PRESENTATION ORDER | UTILIZATION COUNTER | FEATURE NAME |
|---|---|---|
| 2 | 12 | AUTODIAL NUMBER 1 |
| 4 | 0 | HOLD |
| 5 | 0 | TRANSFER |
| 6 | 0 | CONFERENCE |
| 3 | 5 | SEND ALL CALLS |
| 1 | 21 | AUTODIAL NUMBER 2 |

STATE=ACTIVE

| PRESENTATION ORDER | UTILIZATION COUNTER | FEATURE NAME |
|---|---|---|
| 5 | 0 | AUTODIAL NUMBER 1 |
| 2 | 12 | HOLD |
| 1 | 21 | TRANSFER |
| 3 | 4 | CONFERENCE |
| 4 | 3 | SEND ALL CALLS |
| 6 | 0 | AUTODIAL NUMBER 2 |

230'

100
DYNAMICALLY AUTOCONFIGURED FEATURE BROWSER FOR A COMMUNICATION TERMINAL

FIELD OF THE INVENTION

The invention relates generally to communication systems, and more particularly to communication systems supporting wireless mobile telephones or other types of user terminals which utilize feature browsers for providing access to system features.

BACKGROUND OF THE INVENTION

Conventional communication systems may be configured to support wireless terminals which utilize so-called "feature browsers" as part of a user interface for accessing system features. In such an arrangement, the terminal interface typically includes a display which is capable of listing particular system features in a predetermined sequence. The user accesses a given feature by, e.g., first using LEFT and RIGHT navigation keys to scroll through the sequence of features until the given feature is displayed, and then pushing a SELECT key to activate the displayed feature. More particularly, as the user navigates the sequence of features while a given feature n is displayed, pushing the LEFT key results in a previous feature n−1 in the sequence being displayed, while pushing the RIGHT key results in a subsequent feature n+1 being displayed. In this manner, the user is able to access all of the available features using only the LEFT, RIGHT and SELECT keys. This compensates for the typical lack of user interface "real estate" on the wireless terminal by providing full feature access using many fewer physical keys than, e.g., a corresponding wired terminal supported by the same system. The predetermined sequence of features is generally not alterable by the user, but is instead alterable only by a system administrator manually reconfiguring the terminal layout.

A significant problem with the above-described conventional feature browser configuration is that all users are generally presented with the same sequence of features, regardless of the fact that different features are typically utilized more frequently by some users than by others. This leads to unnecessary inefficiency in the navigation process, and undermines the utility of the feature browser.

A need therefore exists for techniques which allow a communication system to control the presentation order of features in a feature browser in a manner that is most meaningful to a given user.

SUMMARY OF THE INVENTION

The invention provides improved feature presentation management in a wireless terminal or other terminal of a communication system. In accordance with the invention, a sequence of features accessible through a feature browser portion of a terminal user interface is dynamically and automatically configured for a corresponding user in accordance with a feature utilization history of that user. As a result, the particular sequence of features presented to the user reflects past feature selection habits of that user. Advantageously, the invention allows the feature browsers of each of a set of users to be configured with a different sequence of features, thereby considerably improving the efficiency of the navigation process.

The utilization history information for a given user may include, e.g., a set of utilization counters for each of a number of features supported by the system, and the presentation order may be determined by sorting the utilization values of the corresponding features in an increasing or decreasing order. The utilization counters may be stored in a feature presentation management table that is implemented in the terminal and includes a feature identifier, a presentation order number and the utilization counter for each of the features. In a bulk feature presentation management technique of the invention, a single feature presentation management table is maintained for the terminal regardless of terminal state. In a state-based method, a different feature presentation management table is maintained for each of a set of designated terminal states, such as on hook, off hook and active, such that different presentation orders may be provided to a single user based upon the particular state of the terminal. In either technique, the feature browser utilizes the feature presentation management table(s) to determine the user-specific order in which features are to be presented on the terminal display.

Unlike conventional techniques, the invention allows a feature sequence presented to a particular user to be dynamically and automatically varied such that the features most often utilized by that user are presented first in the sequence, before other less-often utilized features. As such, a different feature sequence can be presented to each user supported by the system, thereby increasing the efficiency with which features can be accessed via the feature browser. These and other features and advantages of the present invention will become more apparent from the accompanying drawings and the following detailed description.

BRIEF DESCRIPTION OF THE DRAWINGS

FIG. 4 shows a set of default tables for use in a state-based method of feature presentation management in accordance with the invention.

FIGS. 5A, 5B and 5C show example updates to the set of default tables of FIG. 4 in the state-based method of feature presentation management in accordance with the invention.

DETAILED DESCRIPTION OF THE INVENTION

The invention will be illustrated below in conjunction with an exemplary communication system. Although particularly well-suited for use with, e.g., a telephone system which supports both wired deskset terminals and wireless terminals, the invention is not limited to use with any particular type of system or terminal. The disclosed techniques may be used in any communication application in which it is desirable to provide dynamic control of feature presentation on a communication terminal display. For example, the invention may be applied to handsets for use in cellular and personal communication services (PCS) systems, and to other types of communication terminals, such as wired ISDN terminals. The word "terminal" as used herein should therefore be understood to include not only portable wireless handsets as in the illustrative embodiment describe herein, but also other types of communication devices, including personal computers, wired and wireless desksets, optical communication terminals, or any terminal supported by a feature server mechanism whether the mechanisms is embodied in a local switch, a remote switch, a local feature server or a remote feature server.

It should be noted that the invention does not require any particular type of information transport medium, i.e., the invention may be implemented with any desired transport type. The term "switch" as used herein should be understood to include enterprise switches and other types of telecommunication switches, as well as other types of processor-based communication control devices such as servers, computers, adjuncts, etc. The term "table" as used herein is intended to include not only tabular representations as in the illustrative embodiments, but any other type and arrangement of data from which information can be extracted using one or more identifiers. Information stored in an addressable memory is an example of one type of table that may be used in conjunction with the invention.

Figure 1:
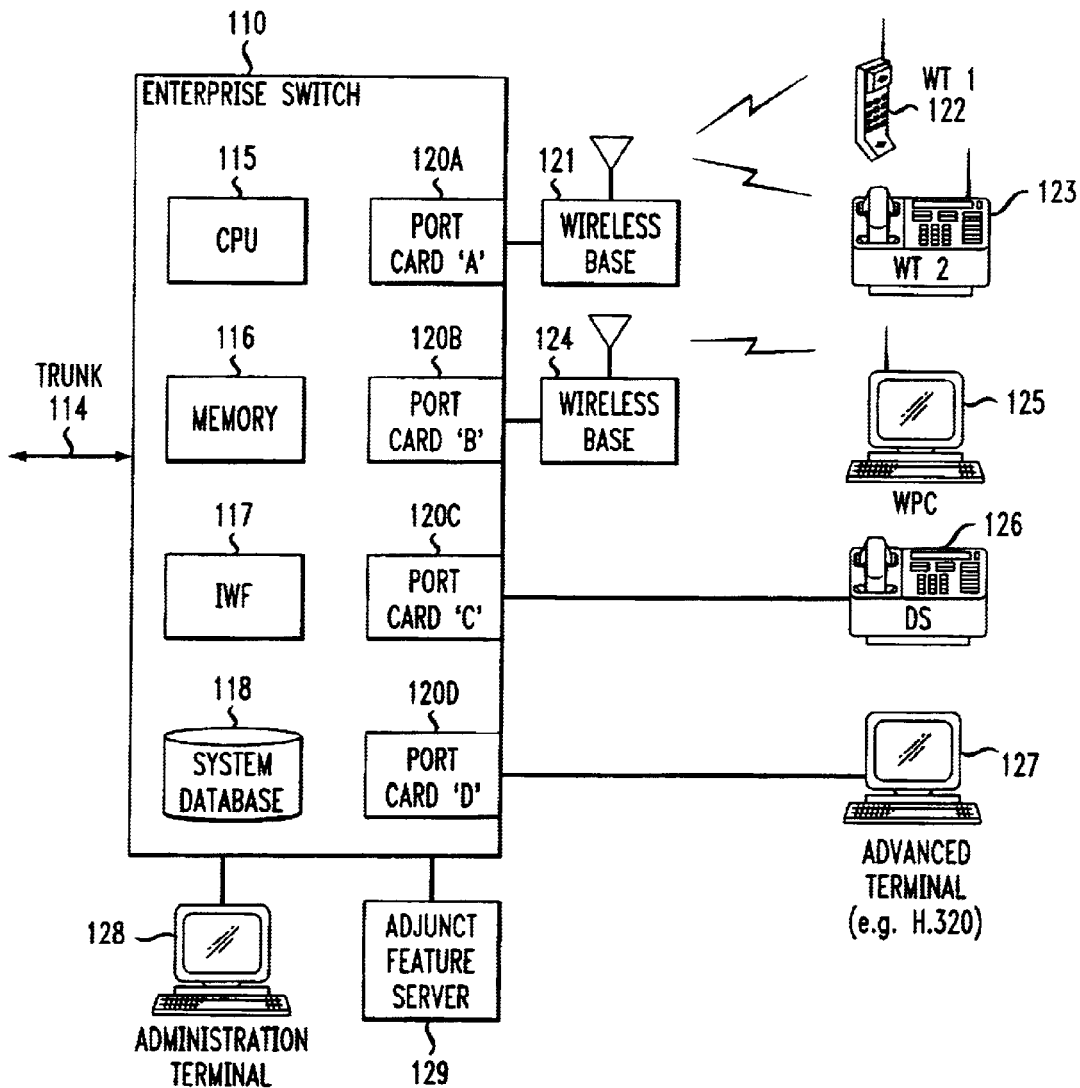
FIG. 1 shows a portion of an exemplary communication system in which the invention may be implemented.

FIG. 1 shows a portion of an exemplary communication system 100 in which the invention may be implemented. The system 100 includes an enterprise switch 110 which receives as an input a trunk 114. The trunk 114 supplies incoming calls to the switch 110 for processing. The switch 110 in this embodiment includes a central processing unit (CPU) 115, a memory 116, at least one interworking function (IWF) 117, and a system database 118. The CPU 115 may be a microprocessor, an application-specific integrated circuit (ASIC) or other type of digital data processor, as well as various portions or combination of such elements. The memory 116 may be a random access memory (RAM), a read-only memory (ROM) or combinations of these and other types of electronic memory devices.

The IWF 117 is used to provide necessary format conversions pertaining to signaling and transport, in a known manner. The IWF 117 may in other embodiments be incorporated into other elements of switch 110, such as the CPU 115 and memory 116. The system database 118 may be used to store, e.g., feature assignments to particular feature buttons, directory number assignments to corresponding call appearances or direct facility termination keys, access restrictions, and other known administrative information regarding the configuration of the system 100, as well as other types of information.

The switch 110 in this example further includes four port cards 120A, 120B, 120C and 120D. Port card 120A is coupled to a wireless base station 121 which communicates with a first wireless terminal (WT) 122 designated WT1 and a second wireless terminal 123 designated WT2. The terminal WT1 may be a mobile telephone, and the terminal WT2 may be a wireless deskset. Port card 120B is connected to a broadband wireless base station, e.g., an IEEE 802.11 wireless local area network (LAN) base station 124, which communicates with a wireless personal computer (WPC) 125. Port card 120C is connected to a wired deskset (DS) 126. Port card 120D is connected to an advanced terminal (AT) 127, which may be, e.g., a video telephone operating in accordance with the H.320 standard. It should be noted that the switch 110 may include additional port cards, and may be connected to other types and arrangements of user terminals. The switch 110 is also connected to an administration terminal 128 which may be used to program the operation of the switch 110 during a system administration, e.g., an initial set-up and configuration of the system or a subsequent system-level or user-level reconfiguration. The administration terminal 128 may be a local terminal or a remote terminal.

The system 100 of FIG. 1 includes an adjunct feature server 129. The adjunct feature server 129 may be directly connected to the switch 110 or connected thereto over a network or other suitable transport medium. The adjunct feature server 129 may be used, e.g., to implement state control logic for use in maintaining or otherwise processing a feature presentation management table in accordance with the invention. Although shown as separate from the switch in the embodiment of FIG. 1, an adjunct such as adjunct feature server 129 is considered to fall within the general definition of the term "switch" as given previously. Such an adjunct may be physically incorporated within the switch in other embodiments of the invention, and may be partially or completely implemented using other switch elements such as CPU 115 and memory 116.

Figure 2:
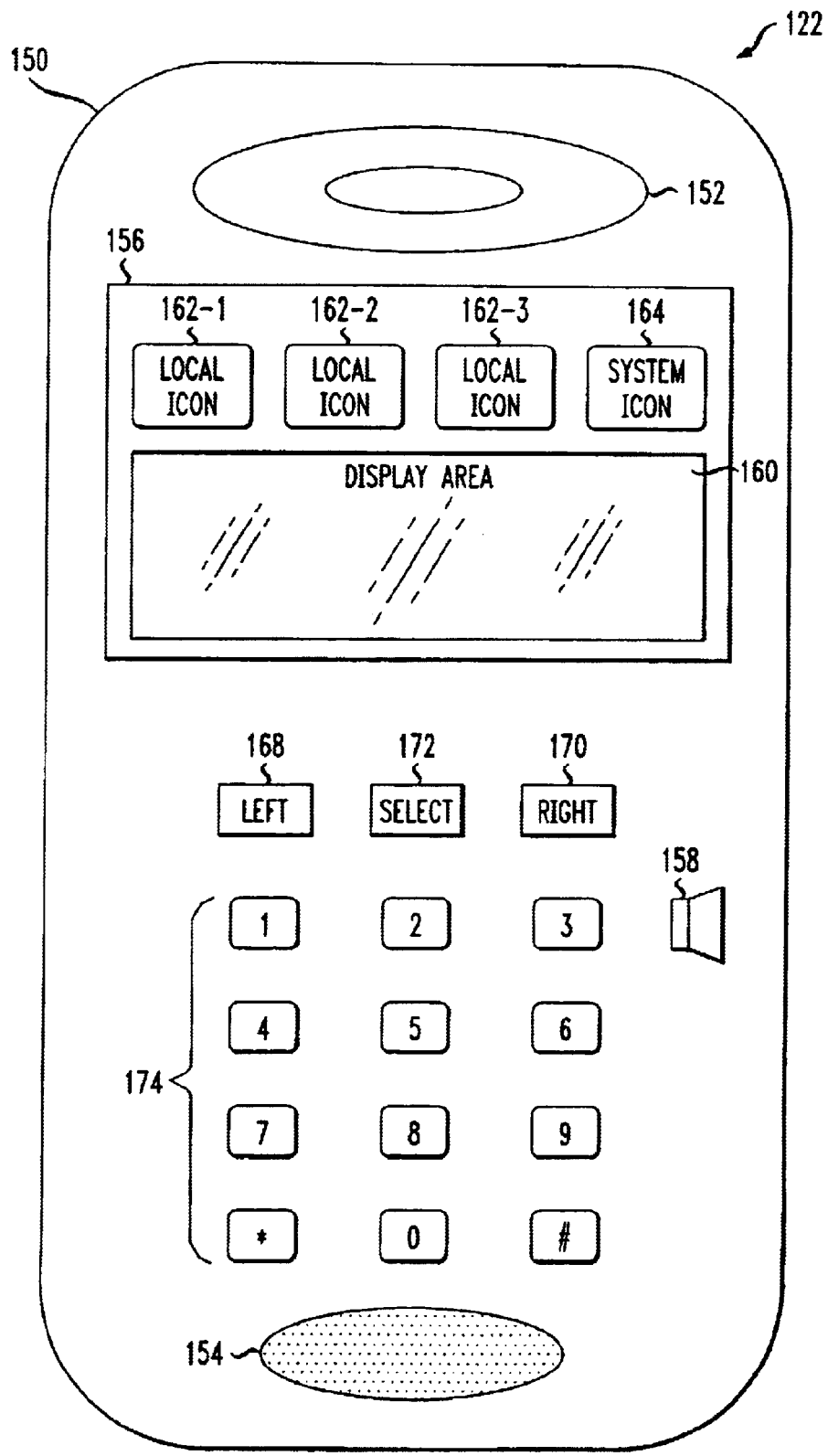
FIG. 2 shows an illustrative embodiment of a wireless terminal configured in accordance with the invention.

FIG. 2 shows a wireless terminal 122, which in the illustrative embodiment of the invention is configured to operate in accordance with feature presentation management methods to be described below in conjunction with FIGS. 3A–3C, 4 and 5A–5C. The terminal 122 includes a housing 150 with a speaker 152, a microphone 154, a display 156 and an audio alerter 158. The display 156, which may be an LCD display or other suitable type of display, includes a display area 160, a set of local icons 162-1, 162-2 and 162-3, and a system icon 164. The local icons 162-1, 162-2 and 162-3 indicate locally-generated status information associated with the wireless terminal, e.g., battery charge remaining, signal strength, etc. The system icon 164 conveys system information supplied to the terminal by the switch. Alternative embodiments could include multiple switch-driven system icons. The wireless terminal 122 further includes a set of three feature browser keys including a LEFT navigation key 168, a RIGHT navigation key 170, and a SELECT key 172, and a set of dial pad keys 174.

It should be emphasized that the configuration of wireless terminal 122 as shown in FIG. 2 is for purposes of illustration only, and should not be construed as limiting the invention to any particular type of terminal. In other embodiments, of the present invention, the terminal may include other arrangements of keys, icons, indicators, etc. For example, the terminal may include a set of soft-labeled keys (SLKs) and a corresponding set of SLK labels in the display 156. A given physical SLK can have multiple function assignments which vary in accordance with label definitions downloaded from the switch, in the manner described in greater detail in U.S. patent application Ser. Nos. 09/272,955, 09/272,956 and 09/272,357, filed Mar. 19, 1999 in the name of inventors Albert D. Baker et al.

In accordance with the invention, the feature browser keys 168 and 170 are used to navigate a feature browser that displays feature names in display area 160 in accordance with a user-specific feature sequence based on a feature utilization history maintained for a particular user. For example, the feature browser may be configured such that, as the user navigates the user-specific sequence of features while a given feature n is displayed, pushing the LEFT key results in a previous feature n−1 in the sequence being displayed, while pushing the RIGHT key results in a subsequent feature n+1 being displayed. The SELECT key is used to activate a particular displayed feature. In this manner, the user is able to access all of the available features using only the LEFT, RIGHT and SELECT keys. Unlike conventional techniques, the feature sequence presented to the particular user is dynamically and automatically varied such that the features most often utilized by that user are presented first in the sequence, before other less-often utilized features. As such, a different feature sequence can be presented to each user supported by the system, thereby increasing the efficiency with which features can be accessed via the feature browser.

A feature browser in accordance with the invention may retain or otherwise make use of feature identifiers associated with specific feature labels to assist in maintaining synchronization with an addressed feature server. The feature identifiers may be processed using techniques such as those described in the above-cited U.S. Patent Applications.

The feature presentation management techniques of the invention may be implemented using, e.g., a bulk method or a state-based method. The operation of the bulk method will be described in conjunction with the feature presentation management tables of FIGS. 3A, 3B and 3C, while the operation of the state-based method will be described in conjunction with the feature presentation management tables of FIGS. 4, 5A, 5B and 5C It should be understood that these methods are merely illustrative of the invention, and it will be apparent to those skilled in the art that the invention can be implemented using other methods.

In the bulk method, the system 100 keeps track of feature activation at the terminal 122 on a bulk basis. More specifically, as a given feature is activated by a user associated with the terminal, this event is recorded in utilization counter entry of a feature presentation management table. As a history of utilization is developed, the presentation order of features on the terminal display is adjusted so that the most used features are presented first and the least used are presented last. Note that at an initial system startup time, e.g., when a terminal is first assigned to a user, utilization counters for all features may be set to zero, and presented to the user in accordance with a system default presentation order.

Figure 3A:
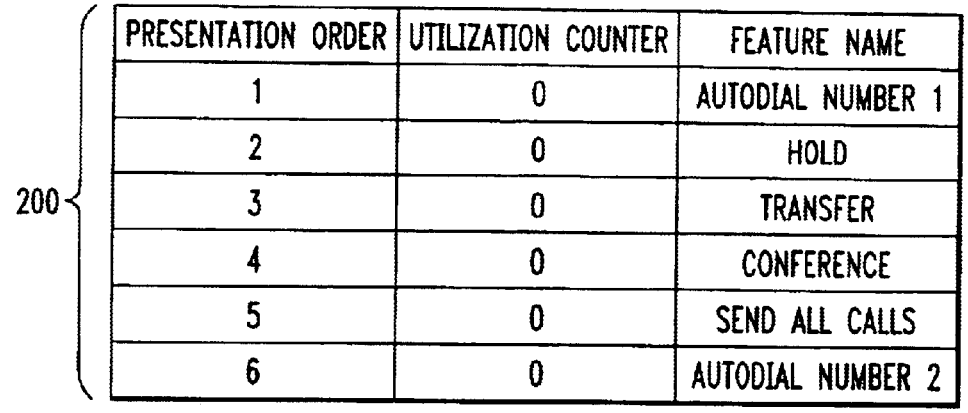
FIGS. 3A, 3B and 3C show examples of feature presentation management tables for controlling features accessible through the FIG. 2 terminal in accordance with a bulk method of feature presentation management in accordance with the invention.
Figure 3B:
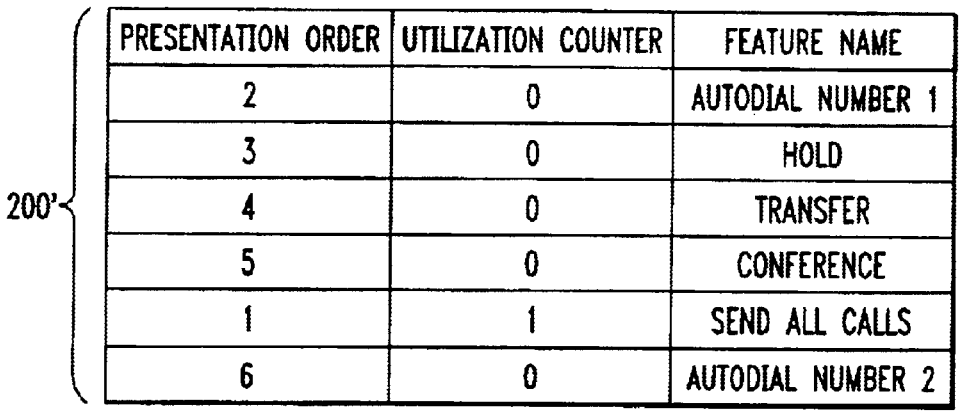
Figure 3C:
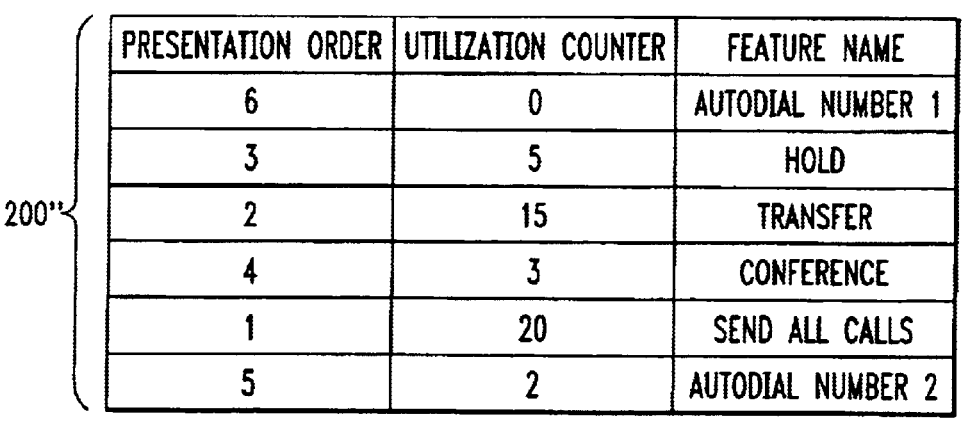

FIGS. 3A, 3B and 3C show examples of feature presentation management tables that will be used to illustrate the operation of the bulk method. FIG. 3A shows a default feature presentation management table 200 that includes six features, Autodial Number 1, Hold, Transfer, Conference, Send All Calls and Autodial Number 2, listed in accordance with the default presentation order. In other words, the order in which the six features will be displayed to a user via the feature browser is the order in which those features are listed in the default table 200. As noted previously, a utilization counter associated with each of the features is set to zero in the default table 200. Each utilization counter maintains a count of the number of times a particular feature is activated by a user at the terminal. It should be understood that the particular features and arrangements thereof in the feature presentation management tables described herein are by way of example only, and numerous other features and arrangements can of course be used.

Assume that at some time after initialization in accordance with the default table 200, the user activates the Send All Calls feature, which diverts all incoming calls to an answering system. The system then takes the following actions:

1. Increment the utilization counter for the Send All Calls feature by one.
2. Sort the presentation order in accordance with the number of utilizations. Since Send All Calls has now been used more than any of the other features, its presentation order number is changed to 1, and all other features are "pushed down" appropriately in the feature presentation management table.

FIG. 3B shows the feature presentation management table 200' that results after the above actions are taken. The Send All Calls feature is now presented first since its presentation order number is 1.

Assume now that after an arbitrary interval of time, the user has activated various features some number of times, e.g., 50 times, and that these activations include 20 uses of the Send All Calls feature, 15 uses of the Transfer feature, 5 uses of the Hold feature, 3 uses of the Conference feature, 2 uses of the Autodial Number 2 feature, and 0 uses of the Autodial Number 1 feature.

FIG. 3C shows the feature presentation management table 200'' that results after these 50 activations. It can be seen that the system has performed the increment operation on the appropriate utilization counter each time a corresponding feature was accessed, and has performed the utilization-based adjustment to the presentation order. Note that the presentation order of the features has changed over time, such that the feature browser now presents the features in the order in which the user is most likely to use them, based on the utilization history of the user as reflected in the set of utilization counters.

Regardless of which feature is displayed to the user at any given time, the feature browser may be configured to automatically return to the first feature in the presentation order after expiration of a timer or other predetermined event.

In the state-based method, a finite number of call states are defined, and a separate feature presentation management table is maintained for each defined state. In the example of FIGS. 4, 5A, 5B and 5C, the following states are defined:

ON HOOK—the phone is inactive, e.g., on the switchhook

OFF HOOK—the phone is in the off-hook condition, e.g., the call is being established but is not yet put-through ACTIVE—The call is put-through, e.g., the user may communicate with the called party It should be emphasized that these states are examples only. Other states could of course be defined, as required by a particular application.

FIG. 4 shows a set of three default feature presentation management tables 210, 220 and 230, corresponding to the ON HOOK, OFF HOOK and ACTIVE states, respectively. Each default table in this example includes the same six features used in the bulk method example, i.e., Autodial Number 1, Hold, Transfer, Conference, Send All Calls and Autodial Number 2, listed in accordance with the default presentation order. In these default tables, as in the bulk method default table 200 of FIG. 3A, the utilization counters for all of the features are set to zero.

The state-based method tracks feature activation on a current-state basis. More specifically, when a given feature is activated, its utilization counter is incremented in the feature presentation management table assigned to the current state. As a result, feature use is more accurately represented in accordance with the manner in which the user actually employs the features. Also note that some features are not relevant to a particular state, and this fact can be reflected in the presentation order.

Assume that after an arbitrary period of time the user has activated various features a number of times in each of the ON HOOK, OFF HOOK and ACTIVE states. More particularly, assume that these activations for the ON HOOK state include 12 uses of the Autodial Number 1 feature, 32 uses of the Send All Calls feature, and 21 uses of the Autodial Number 2 feature, for the OFF HOOK state include 12 uses of the Autodial Number 1 feature, 5 uses of the Send All Calls feature, and 21 uses of the Autodial Number 2 feature, and for the ACTIVE state include 12 uses of the Hold feature, 21 uses of the Transfer feature, 4 uses of the Conference feature, and 3 uses of the Send All Calls feature.

FIG. 5A shows the ON HOOK feature presentation management table 210' that results after the above-described activations in the ON HOOK state. In the ON HOOK state, the most used feature in this example is the Send All Calls feature, and as a result of utilization history it will now be presented first in this state. The two Autodial features have moved up in the presentation order based on their utilization in this state. The Hold, Transfer and Conference features have all moved to the bottom of the presentation order, since they have not been used and in fact are generally not useful in the ON HOOK state.

FIG. 5B shows the OFF HOOK feature presentation management table 220' that results after the above-described activations in the OFF HOOK state. In the OFF HOOK state, the most used features in this example are the Autodial Number 2 feature, followed by the Autodial Number 1 feature. These features have therefore moved to the top of the presentation order as shown, followed by the Send All Calls feature. The Hold, Transfer and Conference features have not been used in this state, and have therefore moved to the end of the presentation order.

FIG. 5C shows the ACTIVE feature presentation management table 220' that results after the above-described activations in the ACTIVE state. In the ACTIVE state, the most used features in this example are the Transfer feature, followed by the Hold, Conference and Send All Calls features. These features will therefore now be presented first. The Autodial features have not been used in this state, and have therefore moved to the end of the presentation order.

It should be noted that the utilization counters can grow large over time, so a suitable reduction operation can be performed periodically to reduce their magnitude. Examples of such reduction operations include, e.g., divide by 2, subtract n, etc. These reduction operations are of course applied to all utilization counters of a given table, so as to preserve the utilization history information reflected by the counter values.

The presentation order can be stabilized by utilizing a damping factor, e.g., the system can be configured such that the presentation order is not updated until the difference in utilization counter values is greater than a specified threshold.

After a period of time, a user might wish to "freeze" their presentation order. This is most likely to occur with a user that has grown comfortable with a particular presentation order, and does not wish the system to perform any further updates. In such a case, the user can provide a suitable command to the system which causes the system to suspend the presentation order updating process for that user.

In the illustrative embodiment, the feature presentation management tables can be maintained in the corresponding terminals, using appropriate hardware and software processing elements. More particularly, the wireless terminal 122 generally includes suitable electronic circuitry for interacting with the switch 110, e.g., a conventional processor and memory, and such elements may be used to implement the feature presentation management techniques described above. Alternatively, the tables may be maintained in the switch, with the presentation orders determined in the switch and periodically downloaded from the switch to the terminals. For example, the feature presentation management techniques in the illustrative embodiment may be implemented in whole or in part in a port card in the serving switch, e.g., in port card 120A associated with wireless base station 121 in system 100 of FIG. 1, elsewhere in the enterprise switch 110, e.g., using CPU 115 and memory 116, in the wireless terminal 122, in the adjunct feature server 129, or in various combinations of these and other system elements. It should be understood that many other arrangements of hardware and/or software may be used to implement feature presentation management in accordance with the invention.

Alternative embodiments of the invention may utilize different switch and terminal configurations, different types of displays, different types of feature browsers, etc. For example, although the illustrative embodiment utilizes a feature browser in which a single displayed feature is activated using a SELECT key, an alternative embodiment may display multiple features at a given time, and use other types of activation mechanisms, e.g., touch screen, mouse, etc. These and numerous other alternative embodiments within the scope of the following claims will be apparent to those skilled in the art.

What is claimed is:

1. A method of controlling an order of presentation of at least one feature on a display of a terminal in a communication system, the method comprising the steps of:
    maintaining utilization history information for each of a plurality of features accessible through the display of the terminal, said terminal having a plurality of user-actuable keys arranged thereon, including at least a first key for navigating through the plurality of features of the terminal, one or more of the features of the terminal each corresponding to a function performed by the terminal, and a second key for activating a given one of the features having an identifier thereof displayed in a designated area of the display; and
    determining a feature presentation order for presentation of at least a subset of the plurality of features on the display of the terminal based at least in part on the utilization history information for those features;
    wherein the utilization history information comprises one or more of a plurality of feature presentation management tables, each of the feature presentation management tables being maintained for a corresponding one of a plurality of different terminal states, different feature presentation orders thereby being providable for each of the different terminal states.

2. The method of claim 1 wherein the display displays an identifier of one of the features at a time, and the feature corresponding to the displayed identifier is activated by depression of a select key on the terminal.

3. The method of claim 1 wherein the display simultaneously displays identifiers of multiple features, and a particular one of the features corresponding to the displayed identifiers is activated by entry of at least one command on the terminal.

4. The method of claim 1 wherein the display in response to depression of at least one navigation key on the terminal sequentially displays feature identifiers in accordance with the determined presentation order.

5. The method of claim 1 wherein the utilization history information is maintained for a particular user associated with the terminal.

6. The method of claim 1 wherein the utilization history information comprises values of utilization counters associated with each of the plurality of features.

7. The method of claim 6 wherein the presentation order is determined by sorting the utilization values of the corresponding features in an increasing or decreasing order.

8. The method of claim 6 wherein a reduction operation is periodically applied to each of the utilization counters.

9. The method of claim 1 wherein the steps of maintaining the utilization history information and determining the presentation order are implemented at least in part in processing elements associated with the terminal.

10. The method of claim 1 wherein the steps of maintaining the utilization history information and determining the presentation order are implemented at least in part in processing elements associated with a switch of the communication system.

11. The method of claim 1 wherein the utilization history information is maintained for each of the plurality of features without regard to a particular state of the terminal.

12. The method of claim 1 wherein the plurality of states comprise at least a subset of an on hook state, an off hook state and an active state.

13. The method of claim 1 wherein the utilization history information and presentation order are in the form of at least one feature presentation management table, the feature presentation management table comprising for each of the features a feature identifier, a utilization counter and a presentation order number.

14. The method of claim 1 wherein a particular presentation order determined in accordance with the utilization history information is maintained without further utilization-based alteration upon entry of a corresponding command by a user at the terminal.

15. An apparatus for use in a communication system, comprising:
 a terminal including a display, said terminal having a plurality of user-actuable keys arranged thereon, including at least a first key for navigating through a plurality of features of the terminal, one or more of the features of the terminal each corresponding to a function performed by the terminal, said one or more features being accessible through the display of the terminal, and a second key for activating a given one of the features having an identifier thereof displayed in a designated area of the display, wherein a feature presentation order for presentation of features on the display of the terminal is determined based at least in part on utilization history information maintained for those features;
 wherein the utilization history information comprises one or more of a plurality of feature presentation management tables, each of the feature presentation management tables being maintained for a corresponding one of a plurality of different terminal states, different feature presentation orders thereby being providable for each of the different terminal states.

16. The apparatus of claim 15 wherein the utilization history maintenance and feature order presentation determination are implemented at least in part in the terminal.

17. The apparatus of claim 15 wherein the utilization history maintenance and feature order presentation determination are implemented at least in part in a switch of the communication system.

18. An apparatus comprising:
 a communication system switch operative to interact with a terminal including a display, said terminal having a plurality of user-actuable keys arranged thereon, including at least a first key for navigating through a plurality of features of the terminal, one or more of the features of the terminal each corresponding to a function performed by the terminal, said one or more features being accessible through the display of the terminal, and a second key for activating a given one of the features having an identifier thereof displayed in a designated area of the display, wherein a feature presentation order for presentation of at least a subset of the features on the display of the terminal is determined based at least in part on utilization history information maintained for those features;
 wherein the utilization history information comprises one or more of a plurality of feature presentation management tables, each of the feature presentation management tables being maintained for a corresponding one of a plurality of different terminal states, different feature presentation orders thereby being providable for each of the different terminal states.

19. An article of manufacture comprising:
 a machine-readable storage medium storing one or more programs for implementing a method of controlling a terminal in a communication system, said terminal having a plurality of user-actuable keys arranged thereon, including at least a first key for navigating through a plurality of features of the terminal, one or more of the features of the terminal each corresponding to a function performed by the terminal, said one or more features being accessible through the display of the terminal, and a second key for activating a given one of the features having an identifier thereof displayed in a designated area of the display, wherein the one or more programs when executed maintain utilization history information for each of the plurality of features accessible through the display of the terminal, and determine a feature presentation order for presentation of at least a subset of the plurality of features on the display of the terminal based at least in part on the utilization history information for those features;
 wherein the utilization history information comprises one or more of a plurality of feature presentation management tables, each of the feature presentation management tables being maintained for a corresponding one of a plurality of different terminal states, different feature presentation orders thereby being providable for each of the different terminal states.

20. A method of controlling an order of presentation of at least one feature on a display of a terminal in a communication system, the method comprising the steps of:
 maintaining utilization history information for each of a plurality of features accessible through the display of the terminal; and
 determining a feature presentation order for presentation of at least a subset of the plurality of features on the display of the terminal based at least in part on the utilization history information for those features,
 wherein said plurality of features comprises at least one telephony-related feature including at least one of an autodial feature for placing a call from the terminal to a specified telephone number, a call hold feature for holding a telephone call placed to the terminal, a call conference feature for conferencing a plurality of calls connected with the terminal, and a call transfer feature for transferring a telephone call from the terminal to another communication device; and
 wherein the utilization history information comprises one or more of a plurality of feature presentation management tables, each of the feature presentation management tables being maintained for a corresponding one of a plurality of different terminal states, different feature presentation orders thereby being providable for each of the different terminal states.

21. An apparatus for use in a communication system, comprising:
 a terminal including a display, wherein a feature presentation order for presentation of features on the display of the terminal is determined based at least in part on utilization history information maintained for those features, wherein said features comprise at least one telephony-related feature including at least one of an autodial feature for placing a call from the terminal to a specified telephone number, a call hold feature for holding a telephone call placed to the terminal, a call conference feature for conferencing a plurality of calls connected with the terminal, and a call transfer feature for transferring a telephone call from the terminal to another communication device;

wherein the utilization history information comprises one or more of a plurality of feature presentation management tables, each of the feature presentation management tables being maintained for a corresponding one of a plurality of different terminal states, different feature presentation orders thereby being providable for each of the different terminal states.

22. An apparatus comprising:

a communication system switch operative to interact with a terminal including a display, wherein a feature presentation order for presentation of features on the display of the terminal is determined based at least in part on utilization history information maintained for those features, wherein said features comprise at least one telephony-related feature including at least one of an autodial feature for placing a call from the terminal to a specified telephone number, a call hold feature for holding a telephone call placed to the terminal, a call conference feature for conferencing a plurality of calls connected with the terminal, and a call transfer feature for transferring a telephone call from the terminal to another communication device;

wherein the utilization history information comprises one or more of a plurality of feature presentation management tables, each of the feature presentation management tables being maintained for a corresponding one of a plurality of different terminal states, different feature presentation orders thereby being providable for each of the different terminal states.

23. An article of manufacture comprising:

a machine-readable storage medium storing one or more programs for implementing a method of controlling a terminal in a communication system, wherein the one or more programs when executed maintain utilization history information for each of a plurality of features accessible through the display of the terminal, and determine a feature presentation order for presentation of at least a subset of the plurality of features on the display of the terminal based at least in part on the utilization history information for those features, wherein said plurality of features comprises at least one telephony-related feature including at least one of an autodial feature for placing a call from the terminal to a specified telephone number, a call hold feature for holding a telephone call placed to the terminal, a call conference feature for conferencing a plurality of calls connected with the terminal, and a call transfer feature for transferring a telephone call from the terminal to another communication device;

wherein the utilization history information comprises one or more of a plurality of feature presentation management tables, each of the feature presentation management tables being maintained for a corresponding one of a plurality of different terminal states, different feature presentation orders thereby being providable for each of the different terminal states.

* * * * *